United States Patent
An et al.

(10) Patent No.: US 9,868,356 B2
(45) Date of Patent: Jan. 16, 2018

(54) EXTENDED-RANGE FULL-ELECTRIC LOW-SPEED TRACTOR

(71) Applicant: Shenzhen Anshun Energy-saving Technology Development Co., Ltd, Shenzhen, Guangdong (CN)

(72) Inventors: Tonghui An, Guangdong (CN); Kai Jia, Guangdong (CN)

(73) Assignee: Shenzhen Anshun Energy-saving Technology Development Co., Ltd, Shenzhen (CN)

( * ) Notice: Subject to any disclaimer, the term of this patent is extended or adjusted under 35 U.S.C. 154(b) by 0 days.

(21) Appl. No.: 15/505,916

(22) PCT Filed: Sep. 9, 2016

(86) PCT No.: PCT/CN2016/098622
§ 371 (c)(1),
(2) Date: Feb. 22, 2017

(87) PCT Pub. No.: WO2017/041751
PCT Pub. Date: Mar. 16, 2017

(65) Prior Publication Data
US 2017/0355269 A1    Dec. 14, 2017

(30) Foreign Application Priority Data

Sep. 11, 2015  (CN) .................... 2015 2 0704319 U

(51) Int. Cl.
*B60W 20/00*   (2016.01)
*B60L 11/14*   (2006.01)
(Continued)

(52) U.S. Cl.
CPC ............ *B60L 11/14* (2013.01); *B60L 11/126* (2013.01); *B60L 11/1814* (2013.01); *B60L 11/1803* (2013.01); *B60L 11/1805* (2013.01)

(58) Field of Classification Search
CPC .... B60W 20/00; B60W 20/106; B60W 10/06; B60W 10/24; B60W 10/26
See application file for complete search history.

(56) References Cited

U.S. PATENT DOCUMENTS 9,248,827 B2 *   2/2016   Kamatani .............. B60K 6/445

FOREIGN PATENT DOCUMENTS

| CN | 103192734 A | 7/2013 |
| CN | 204586537 U | 8/2015 |
| CN | 204928358 U | 12/2015 |

OTHER PUBLICATIONS

International Search Report of PCT Patent Application No. PCT/CN2016/098622 dated Dec. 1, 2016.

* cited by examiner

*Primary Examiner* — John Walters
*Assistant Examiner* — James Triggs

(57) ABSTRACT

Disclosed is an extended-range full-electric low-speed tractor, which includes a system control unit, a battery pack, a frequency conversion driver, a bidirectional DC-DC converter, a generating set and a drive system. The generating set is capable of working in an intermittent mode. The generating set will be started when the power of the battery pack is lower than a preset working range; once the generating set begins to work, the generating set will be running under a condition of "the most economic fuel consumption" and provide stable output at constant speed and constant power, so as to make sure that the generating set is not overloaded, emits no black smoke and has highest energy efficiency. It has advantages of low energy consumption, low pollution and long life of the generating set.

3 Claims, 2 Drawing Sheets

(51) Int. Cl.
*B60L 11/12* (2006.01)
*B60L 11/18* (2006.01)

EXTENDED-RANGE FULL-ELECTRIC LOW-SPEED TRACTOR

FIELD OF THE INVENTION

The present invention relates to the field of energy utilization, and more particularly to an extended-range full-electric low-speed tractor.

BACKGROUND OF THE INVENTION

The special low-speed tractor is generally used for horizontal transport operations at cargo terminals. The highest speed of the tractor specialized to cargo terminal is designed to be about 40 km/h. Its drive system includes an engine, a clutch, a gearbox, a rear axle (drive axle) and a drive wheel. Diesel oil, gas oil and natural gas may be used as fuels for the engine.

During the operation process at cargo terminals, the efficiency of the loading and unloading ships is the most important thing. In order to ensure the operation efficiency of the loading and unloading ships (shoreline equipment), one shoreline equipment on each operation line is generally configured with 4-9 horizontal transport vehicles (tractors). The unloading process of the tractor at container terminals is generally as follows: moving and aligning with the target position on the shoreline, waiting for loading, starting and accelerating with heavy load, driving to the designated store yard according to the designated route, moving and aligning with the target position in the store yard, waiting for unloading, starting and accelerating without load, driving to the shoreline according to the designated route, waiting for moving and aligning with the target position. During the whole operation cycle, the waiting time exceeds 50%, the time of low-speed movement and alignment exceed 25%, and the time of driving with heavy load is less than 25%. However, the power of the tractor must be configured according to the maximum load, thus the engine power of the tractor specialized to cargo terminal is generally about 200 kW. During the actual operation, the tractor will spend much time in waiting state or light load state, while it often emits black smoke when starting with heavy load, leading to low energy efficiency, short maintenance cycle of the engine and high maintenance cost.

Although the plug-in full-electric tractor can be used to solve the above problems, it is not realistic to apply such a tractor to the cargo terminal for the following reasons: the operating environment of the cargo terminal is unique; once starting the operation of loading and unloading ship, large number of tractors are needed, but it cannot build many charging units to match with the tractors due to site limitation and high cost of investment and use, in addition, the power of the battery is limited, and the tractor is not allowed to stop to charge during the operation.

SUMMARY OF THE INVENTION

An objective of the present invention is to provide an extended-range full-electric low-speed tractor, mainly used at cargo terminals, factories and so on, so as to solve the defects of the prior art, including high energy consumption, high pollution, high damage rate of the engine and poor endurance of tractors and so on.

To solve the above problems, there are provided following technical solutions:

An extended-range full-electric low-speed tractor, which comprises a system control unit, a battery pack, a frequency conversion driver, a bidirectional DC-DC converter, a generating set and a drive system, the generating set comprising an engine and a generator connected to the engine, the frequency conversion driver comprising an AC/DC converter and a DC/AC bidirectional converter; wherein the generating set is connected to the AC/DC converter and then divided to two branch circuits, one being connected to the bidirectional DC-DC converter and the battery set in sequence via a DC bus and the other one being connected to the DC/AC bidirectional converter; the battery pack, the bidirectional DC-DC converter, the generating set and the frequency conversion driver are all signal controlled by the system control unit; the DC/AC bidirectional converter is connected to a load; a charging-discharging power of the battery set is greater than or equal to a power of the drive system; the drive system comprises a drive motor, a gearbox, a drive axle and a drive wheel, all of which are connected in sequence; and the DC/AC bidirectional converter is connected to the drive motor.

Furthermore, the extended-range full-electric low-speed tractor further comprises an auxiliary power supply connected to the DC bus.

Furthermore, the extended-range full-electric low-speed tractor further comprises a 24V DC power supply connected to the DC bus.

According to the extended-range full-electric low-speed tractor of the present invention, the generating set is capable of working in an intermittent mode. The generating set will be started when the power of the battery pack is lower than a preset working range; once the generating set begins to work, the generating set will be running under a condition of "the best economical fuel consumption" and provide stable output at constant speed and constant power, so as to make sure that the generating set is not overloaded, emits no black smoke and has highest energy efficiency. When working, the power outputted by the generating set is firstly used to satisfy the need of the drive system of the tractor and the surplus power is provided for charging the battery pack. The generating set will be shut off when the power of the battery pack reaches a preset high value. During the whole working course, the actual working time of the generating set is shorter than the total operating time of the tractor. The actual working time of the generating set is shorter when the power thereof is greater. Because the generating set is controlled to output power in a condition of "the best economical fuel consumption", the actual energy consumption of the system of the present invention has little to do with the power of the generating set. The total energy consumption depends on the characteristics of the selected generating set. Additionally, the present invention has advantages of low energy consumption, low pollution and long life of the generating set, etc.

The above mentioned and other features of the present invention, and the manner of attaining them, will become more apparent and the present invention itself will be better understood by reference to the following description of embodiments of the present invention taken in conjunction with the accompanying drawings.

DESCRIPTION OF THE REFERENCE NUMBER IN THE FIGURES

Figure 1:
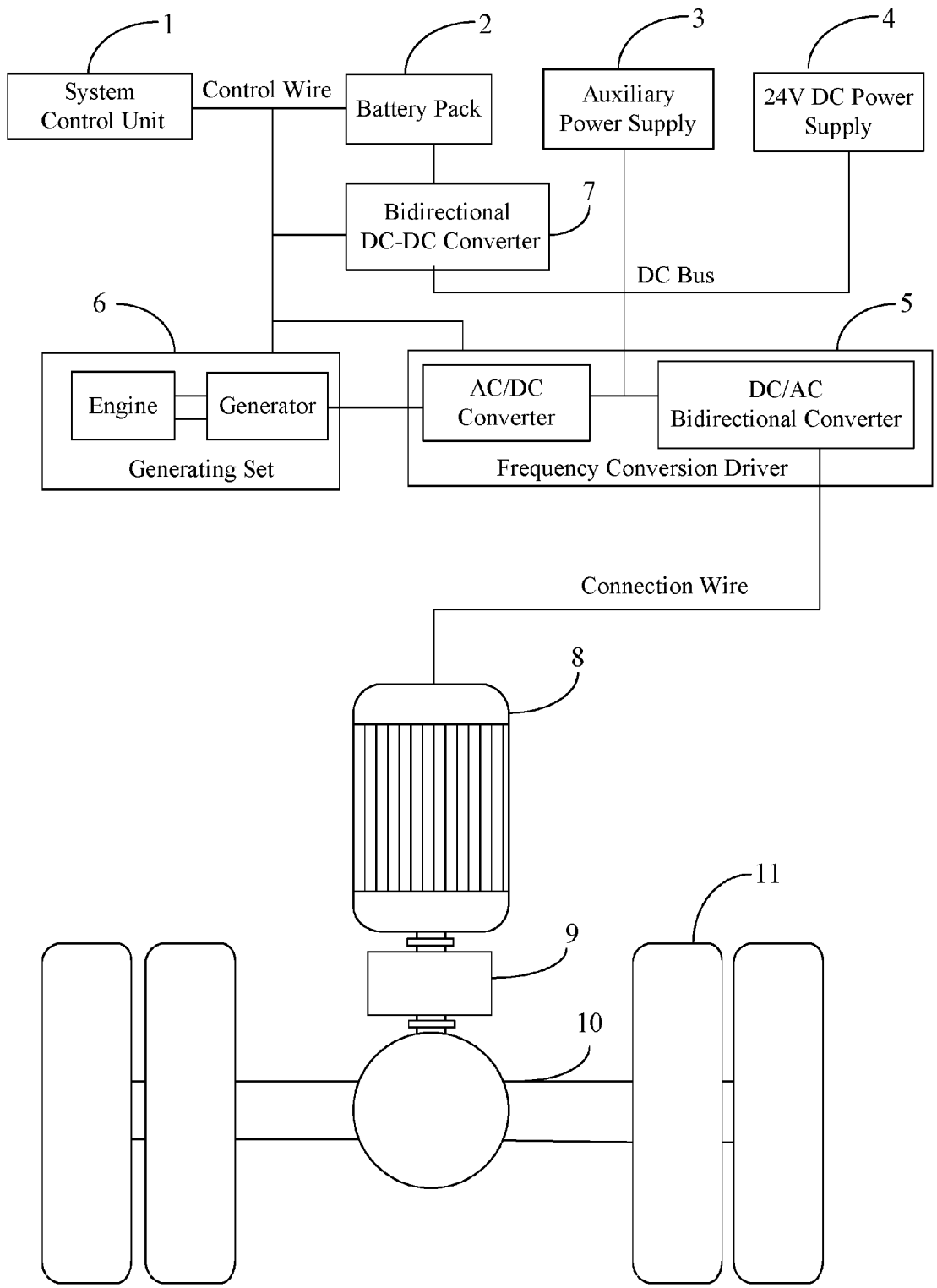
FIG. 1 is a functional block diagram according to an embodiment of the present invention.

System control unit 1; battery pack 2; auxiliary power supply 3; 24V DC power supply 4; frequency conversion driver 5; generating set 6; bidirectional DC-DC converter 7; drive motor 8; gearbox 9; drive axle 10; and drive wheel 11.

DETAILED DESCRIPTION OF ILLUSTRATED EMBODIMENTS

For understanding the objective, the technical content and the advantages of the present invention more sufficiently, some embodiments of the present invention will be described as follows, by way of example only, with reference to the accompanying drawings. The embodiments disclosed below are not intended to be exhaustive or to limit the invention to the precise forms disclosed in the following detailed description.

Referring to FIG. 1, the extended-range full-electric low-speed tractor of the present invention is mainly used at cargo terminals, factories and so on. The tractor includes a system control unit 1, a battery pack 2, a frequency conversion driver 5, a bidirectional DC-DC converter 7, a generating set 6 and a drive system. The generating set 6 includes an engine and a generator connected to the engine. The frequency conversion driver 5 includes an AC/DC converter and a DC/AC bidirectional converter. The generating set 6 is connected to the AC/DC converter and then divided to two branch circuits, one is connected to the bidirectional DC-DC converter 7 and the battery set 2 in sequence via a DC bus and the other one being connected to the DC/AC bidirectional converter. The battery pack 2, the bidirectional DC-DC converter 7, the generating set 6 and the frequency conversion driver 5 are all connected to and signal controlled by the system control unit 1. The DC/AC bidirectional converter is connected to a load. The battery set 2 has a charging-discharging power which is greater than or equal to a power of the drive system. The drive system includes a drive motor 8, a gearbox 9 connected to the drive motor 8, a drive axle 10 connected to the gearbox 9 and a drive wheel 11 connected to the drive axle 10, that is, all of which are connected in sequence. The DC/AC bidirectional converter is connected to the drive motor 8.

In this preferred embodiment, the extended-range full-electric low-speed tractor further includes an auxiliary power supply 3 and a 24V DC power supply 4 both connected to the DC bus. The auxiliary power supply 3 is provided to supply power to the auxiliary devices in the tractor, such as air conditioner, air pump, electric power steering system and so on. The 24V DC power supply is provided to supply power to the lighting devices, the generating set 6 and so on.

According to the extended-range full-electric low-speed tractor of the present invention, the generating set 6 is capable of working in an intermittent mode. The generating set 6 will be started when the power of the battery pack 2 is lower than a preset working range; once the generating set 6 begins to work, the generating set 6 will be running under a condition of "the best economical fuel consumption" and provide stable output at constant speed and constant power, so as to make sure that the generating set 6 is not overloaded, emits no black smoke and has highest energy efficiency. When working, the power outputted by the generating set 6 is firstly used to satisfy the need of the drive system of the tractor and the surplus power is provided for charging the battery pack 2. The generating set 6 will be shut off when the power of the battery pack 2 reaches a preset high value. During the whole working course, the actual working time of the generating set 6 is shorter than the total operating time of the tractor. The actual working time of the generating set 6 is shorter when the power thereof is greater. Because the generating set 6 is controlled to output power in a condition of "the best economical fuel consumption", the actual energy consumption of the system of the present invention has little to do with the power of the generating set 6. The total energy consumption depends on the characteristics of the selected generating set 6. Additionally, the present invention has advantages of low energy consumption, low pollution and long life of the generating set 6. The components, the connection relationship thereof and the innovation of the system control software are all included within the scope of protection of the invention.

The selection of specific parameters and the energy control of the system will be described as follows:

Determine the voltage of the DC bus and select the voltage grade of the battery pack 2 and then set the working range thereof, according to the working voltage range of the frequency conversion driver 5. The system control unit adjusts the input and output voltages of the battery pack 2 by means of the bidirectional DC-DC converter 7, and finally controls the charging and discharging current, so as to make the frequency conversion driver 5 be stable and ensure energy balance of the system. The auxiliary power supply 3 and the 24V DC power supply 4 are designed according to the voltage grade of the DC bus.

Figure 2:
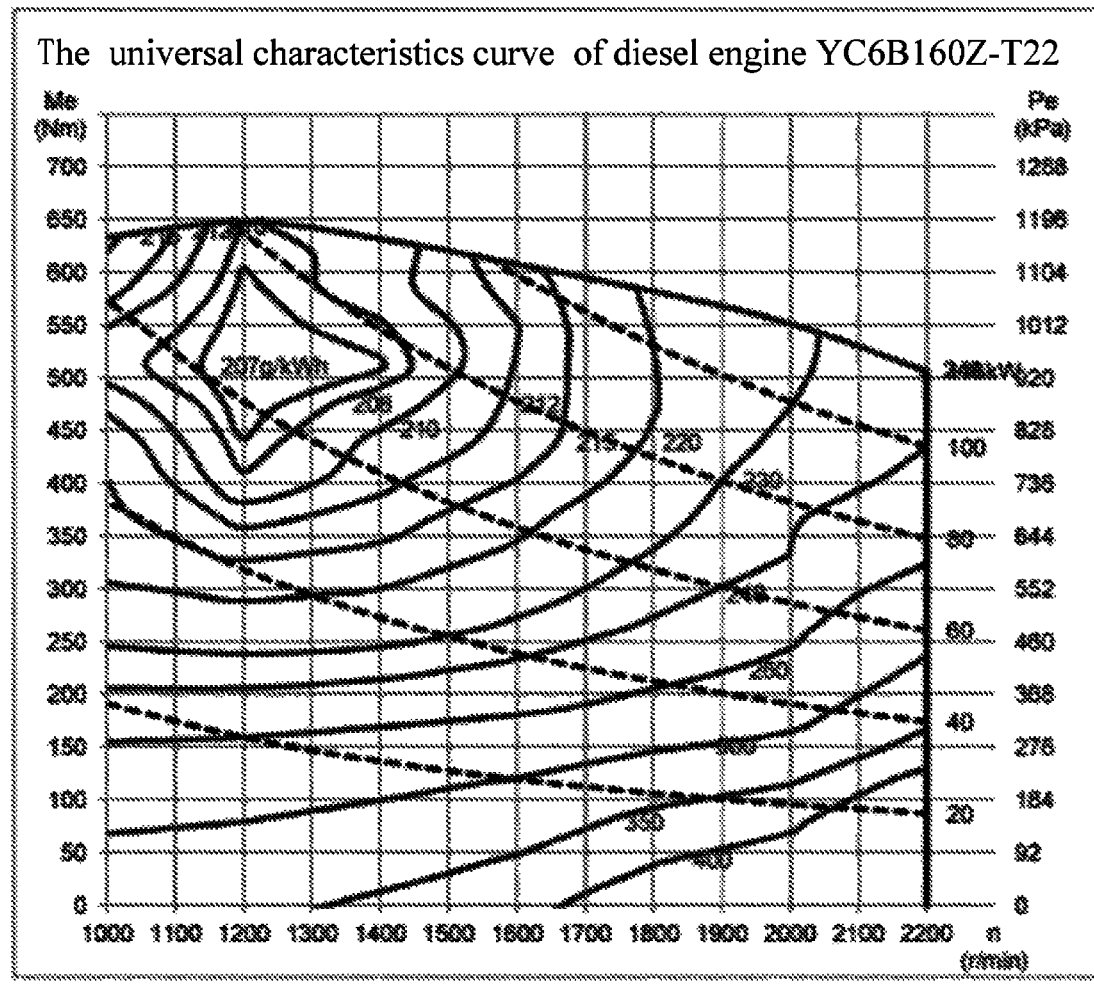
FIG. 2 is a universal characteristics curve of a diesel engine.

The generating set 6 is a power source for the whole tractor, thus how to design, control and manage the power of the generating set 6 is the key point of the system of the present invention. FIG. 2 illustrates a universal characteristics curve of a diesel engine. As shown in FIG. 2, when the rotational speed is about 1250 rpm and the output is 60-80 kW, the diesel engine has best specific fuel consumption 207 g/kWh, which is called "the most economic fuel consumption zone". Suppose the diesel engine shown in FIG. 2 is selected to be used in the present invention, the working speed is set to 1250 rpm, and then corresponding generator is selected to match with the engine according to the working speed thereof, so as to make sure that the generating set 6 has maximum efficiency and the output voltage thereof can match with the voltage of the DC bus when the working speed is 1250 rpm. The generating set 6 is controlled to work in the "the most economic fuel consumption zone" so that the energy efficiency can reach a maximum value. The generating set 6 is set to work in three states: idle speed, full speed of 1250 rpm and stop state. During the whole working course of the tractor, the generator is running intermittently.

When the power of the battery pack 2 is within the preset range, the generating set 6 will be in a stop state, all of the power that the tractor required is supplied by the battery pack 2, and the power outputted by the battery pack 2 can match the need of the whole tractor under the control of the system control unit 1. When the power of the battery pack is reduced to the preset low value, the system control unit 1 will control the generating set 6 to work as follows: start up idle speed full speed; after entering normal working state, the generating set 6 will supply power to the whole tractor in a state of "the most economic fuel consumption" with constant speed and constant power, and the surplus power is used for charging the battery pack 2. The battery pack 2 serves as supplementary power supply for the whole tractor when the energy is insufficient. When the power of the battery pack 2 is increased to a preset high value, the system control unit 1 will control the generating set 6 to work as follows: full speed idle speed shut off, thus the power that the whole tractor needed is supplied by the battery pack 2. The whole tractor is driven by the drive motor 8, the starting torque of the tractor is enough, the motor brake takes precedence when braking, and the regenerative braking power will be recycled back into the battery pack 2. The pneumatic braking system and the motor braking system will both play roles at the same time when braking in an emergency, thus it can lead to a better safety performance compared with the traditional tractor.

Above descriptions of embodiments are provided for further illustrating the technical content of the present invention, so as to facilitate understanding and it should be understood that the invention is not to be limited to the disclosed embodiments. Any technique extension and recreation according to the present invention should be included within the scope of protection of the invention.

What is claimed is:

1. An extended-range full-electric low-speed tractor, wherein comprises a system control unit, a battery pack, a frequency conversion driver, a bidirectional DC-DC converter, a generating set and a drive system, the generating set comprising an engine and a generator connected to the engine, the frequency conversion driver comprising an AC/DC converter and a DC/AC bidirectional converter; wherein the generating set is connected to the AC/DC converter and then divided to two branch circuits, one being connected to the bidirectional DC-DC converter and the battery set in sequence via a DC bus and the other one being connected to the DC/AC bidirectional converter; the battery pack, the bidirectional DC-DC converter, the generating set and the frequency conversion driver are all signal controlled by the system control unit; the DC/AC bidirectional converter is connected to a load; a charging-discharging power of the battery set is greater than or equal to a power of the drive system; the drive system comprises a drive motor, a gearbox, a drive axle and a drive wheel, all of which are connected in sequence; and the DC/AC bidirectional converter is connected to the drive motor.

2. The extended-range full-electric low-speed tractor according to claim 1, wherein the tractor further comprises an auxiliary power supply connected to the DC bus.

3. The extended-range full-electric low-speed tractor according to claim 1, wherein the tractor further comprises a 24V DC power supply connected to the DC bus.

* * * * *